United States Patent Office 3,547,598
Patented Dec. 15, 1970

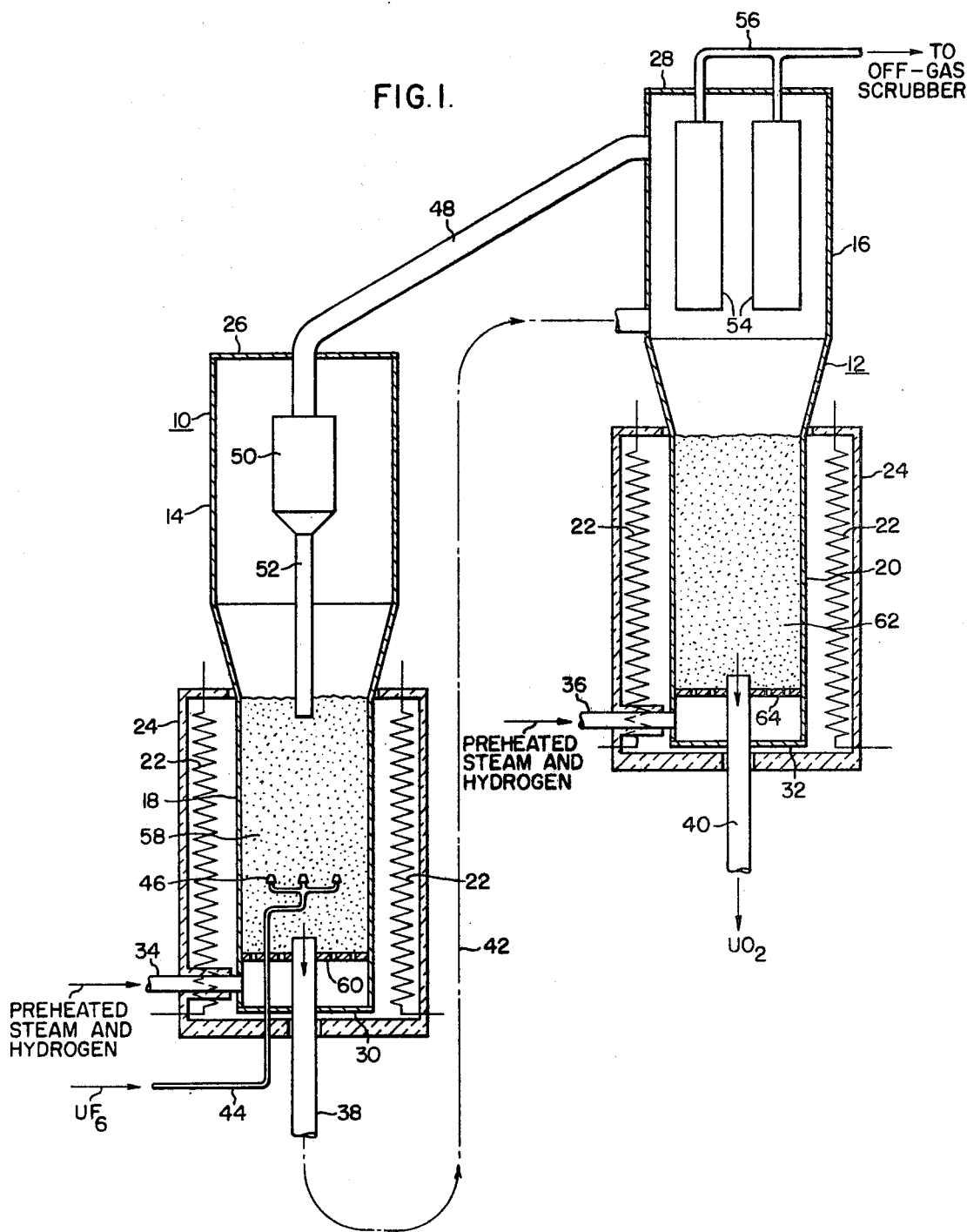

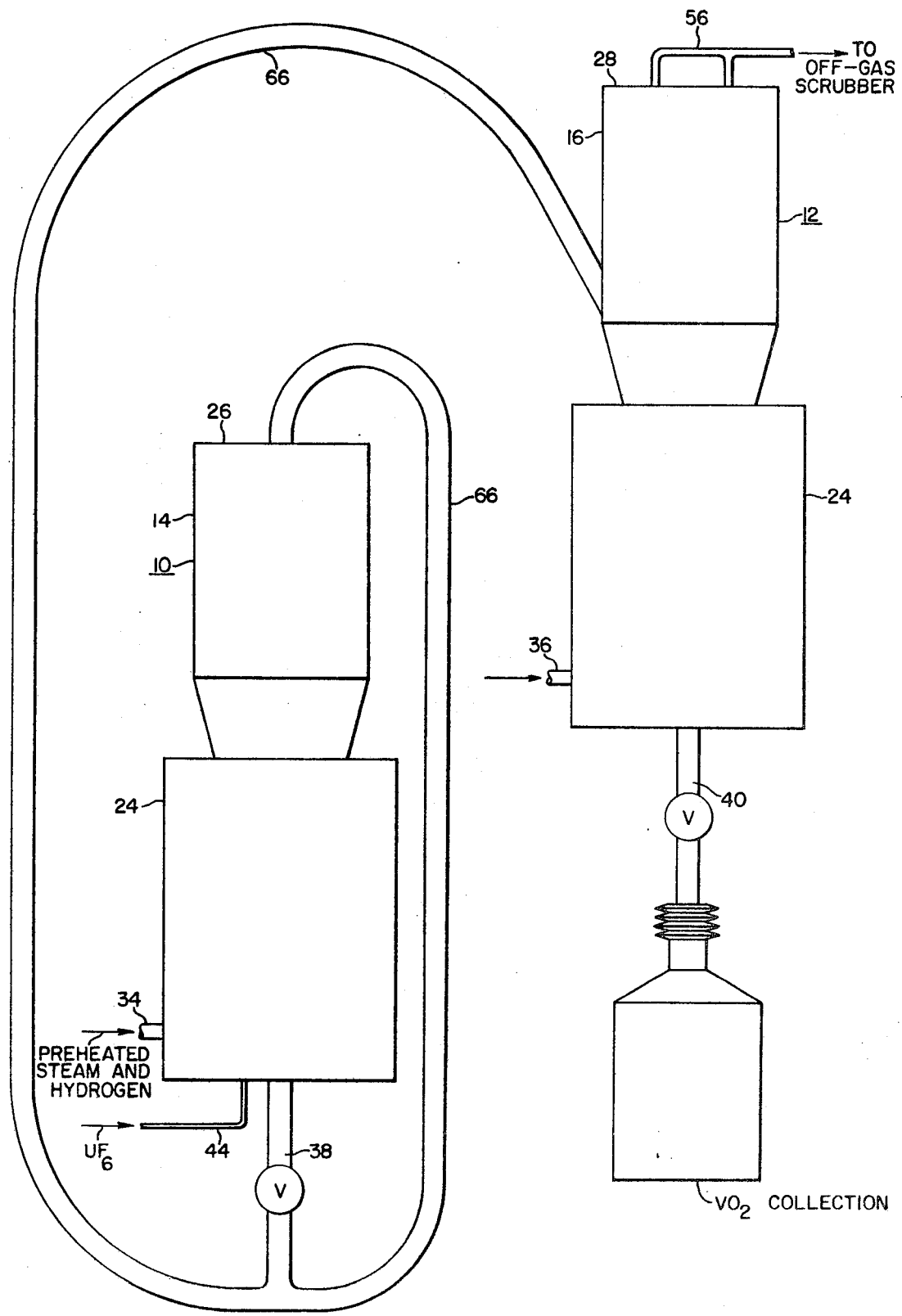

3,547,598
PRODUCTION OF URANIUM DIOXIDE
Irving E. Knudsen, Murrysville, Pa., assignor to Westinghouse Electric Corporation, Pittsburgh, Pa., a corporation of Pennsylvania
Filed Mar. 28, 1968, Ser. No. 716,891
Int. Cl. C01g 43/02
U.S. Cl. 23—355      11 Claims

ABSTRACT OF THE DISCLOSURE

A two-stage process for converting uranium hexafluoride ($UF_6$) to a ceramic-grade uranium dioxide ($UO_2$) powder by, first, reacting hydrogen and steam with ($UF_6$) to form solid intermediate products uranyl fluoride ($UO_2F_2$) and triuranium octoxide ($U_3O_8$) in a first fluidized bed and, second, reacting hydrogen and steam with the intermediate products in a second fluidized bed to produce ceramic-grade $UO_2$ powder.

BACKGROUND OF THE INVENTION

Field of the invention

This invention relates to the production of ceramic-grade uranium dioxide powder. More particularly, it pertains to the conversion of uranium hexafluoride to uranium dioxide by a continuous procedure involving two fluidized beds in series. Both enriched uranium hexafluoride and natural uranium hexafluoride can be processed.

Description of the prior art

The use of uranium dioxide as a fuel in nuclear reactors is increasing because of its desirable physical and chemical properties, such as inertness to cooling media, irradiation stability, and good retention of fission gases. These properties make the uranium dioxide well suited for application in both bulk and dispersion forms. The uranium dioxide is relatively easy to prepare and to fabricate into desired shapes, and it is emenable to chemical reprocessing after irradiation. With the growth of the nuclear power field, reduced costs of preparation provide added incentive for further application of the uranium oxide as fuel material.

A process generally employed for the conversion of uranium hexafluoride to uranium dioxide, as is disclosed in U.S. Pat. No. 3,160,471 primarily involves aqueous precipiation, filtration, drying, calcination, and reduction steps. The substitution of fluidization techniques for the aqueous precipitation method would offer cost savings because of inherent simplicity of processing equipment, good temperature control, and improved solids-handling characteristics.

Most aqueous procedures typically do not permit the control of conditions that provide a uranium dioxide powder having the desired combination of uniformity and sinterability. Heretofore, most known methods for producing uranium dioxide powders have not produced a suitably porous solid product which was consistently active ceramically. That is, at typical sintering conditions compacts of uranium dioxide powders should sinter readily to a high density body. Prior methods for producing uranium dioxide powders having consistently high quality which is readily sinterable have been costly.

It has been found in accordance with this invention that the foregoing disadvantages may be overcome by the use of a dual fluidized bed system by which a consistently high quality ceramic-grade uranium dioxide powder is produced. In the system uranium hexafluoride is fed into a first fluidized bed where it is converted at elevated temperatures by reaction with steam and hydrogen to a mixture of solids such as $UO_2$, $UO_2F_2$, $UF_4$, $U_3O_8$, and the like. This mixture of solids, or impure product, is conveyed to a second fluidized bed where the mixture is further reacted and purified in the presence of steam and hydrogen to produce a consistently uniform ceramic-grade of uranium dioxide powder which is readily sinterable to a high density.

Accordingly, it is a general object of this invention to provide a process for the production of uranium dioxide powders from $UF_6$ in which conditions for the conversion of the uranium hexafluoride are readily controlled to produce a ceramic-grade uranium dioxide powder of uniform quality.

It is another object of this invention to provide a process for the production of uranium dioxide by a two-stage fluidized bed process in which an intermediate impure product comprising an admixture of various uranium compounds is developed in the first fluidized bed and is subsequently fully reacted to essentially pure $UO_2$ in the second bed under readily controlled conditions remote from the contaminated atmosphere of the first fluidized bed.

Finally, it is an object of this invention to satisfy the foregoing objects and desiderata in a simple and economical manner.

SUMMARY OF THE INVENTION

Generally, the process of the present invention involves reactions substantially as follows: Uranium hexafluoride gas, steam, and hydrogen are introduced into a first fluidized bed reactor where at temperatures of from 475° to 600° C. the following reactions take place:

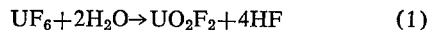
$$UF_6 + 2H_2O \rightarrow UO_2F_2 + 4HF \qquad (1)$$
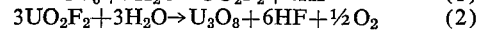
$$3UO_2F_2 + 3H_2O \rightarrow U_3O_8 + 6HF + \tfrac{1}{2}O_2 \qquad (2)$$
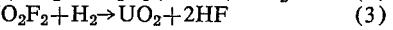
$$UO_2F_2 + H_2 \rightarrow UO_2 + 2HF \qquad (3)$$

The range 475° to 600° C. is critical to obtain a ceramically active $UO_2$ powder at the completion of the process.

The three uranium oxide compounds of this first reaction are then conveyed to a second fluidized bed reactor where in the presence of steam and hydrogen, at temperatures of from 540° to 650° C. reactions (2) and (3) occur, as well as the following additional reaction:

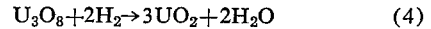
$$U_3O_8 + 2H_2 \rightarrow 3UO_2 + 2H_2O \qquad (4)$$

Reaction (4) may take place to a limited extent in the first reactor. In the second fluidized bed reactions (2), (3), and (4) predominate and result in essentially stoichiometric production of $UO_2$ from the $UF_6$ as particles of up to about 1000 microns in diameter, having a bulk density near 3 grams per cc. and a BET surface area of from 1 to 2 m² per gram for the —45 to +60 mesh fraction (i.e., the particles pass a 45 mesh screen but are retained on a 60 mesh screen). The BET test is a standard procedure based on nitrogen adsorption to measure surface area of powders.

In the first fluidized bed, the reactions occur most efficiently at temperatures ranging from 525° to 590° C., with the optimum temperature being at about 550° C., while in the second fluidized bed the most efficient reaction occurs at from 575° to 625° C., with the optimum being at about 600° C.

BRIEF DESCRIPTION OF THE DRAWINGS

For a better understanding of the invention reference is made to the accompanying drawing in which:

FIG. 1 is a diagrammatic view of a pair of fluidized bed reactors for practicing the invention by one process, and FIG. 2 is a diagrammatic view of the reactors used for practicing the invention by an alternate arrangement.

Similar numerals refer to similar parts throughout the drawings.

DESCRIPTION OF THE PREFERRED EMBODIMENT

As shown in FIG. 1, a first fluidized bed reactor generally indicated at 10 is used in series with a second fluidized bed reactor generally indicated at 12 which reactors are referred to as the primary and secondary reactors, respectively. The reactors 10 and 12 are tubular members having vertical axes and preferably have upper portions 14 and 16 which are greater than lower portions 18 and 20. The lower portions 18 and 20 are enclosed within the heating means as for example similar electric heating resistance elements 22 and housings 24. The upper ends of the reactors 10 and 12 are closed by covers 26 and 28, respectively, and the lower ends are closed by covers 30 and 32, respectively, which covers are detachably mounted in a manner not shown.

For the reactor 10 an inlet 34 for introducing preheated steam and hydrogen is provided at the lower end of the lower portion 18. In a similar manner an inlet 36 for introducing preheated steam and hydrogen is provided for the reactor 12 at the lower end of the lower portion 20. In addition, the reactor 10 is provided with a product outlet conduit 38 and the reactor 12 is provided with an outlet conduit 40. As shown schematically by the line 42 the conduit 38 extends to the upper portion 16 of the reactor 12 where the reaction products of a primary reactor 10 are introduced into the secondary reactor 12.

Uranium hexafluoride ($UF_6$), a gas, is introduced into the primary reactor 10 through a conduit 44 the upper end of which is provided with a gas distributor nozzle 46 to introduce the $UF_6$ into the lower portion 18 of the reactor.

A conduit 48 extends from the upper end of the primary reactor 10 to the upper reactor portion 16 for conveying hot gases and transferring fine particles of reactor products elutriated from the primary reactor to the secondary reactor. A cyclone separator 50 may be provided at the lower end of the conduit 48 within the upper reactor portion 14 for separating the coarser particles of reaction products from the finer particles passing through the conduit 48. The coarser particles are returned from the separator 50 to the lower reactor portion 18 through a conduit 52.

A plurality of filters 54 are provided in the upper reactor portion 16 of the secondary reactor 12 for separating the fine solid reaction particles from the reaction gases which gases are vented from the reactor 12 through outlet conduit means 56, as well as the solids carried in the gases carried by conduit 48 from reactor 10.

FIRST REACTOR

The primary reactor 10 functions in accordance with the reactions of Equations 1, 2, 3, and 4 set forth above to cause the uranium hexafluoride gas introduced through the nozzle 46 to react with controlled amounts of hydrogen and steam introduced through the conduit 34. For initiating reaction, a starting bed 58 composed of a mixture of particles of uranyl fluoride and uranium oxides is supported on a perforated distribution plate 60 and has an upper level when fluidized near the upper end of the lower reactor portion 16.

The temperature within the lower reactor portion 18 is maintained at approximately 475° to 600° C. The reaction products are a mixture of $UO_2$, $UO_2F_2$, $U_3O_8$ gaseous hydrogen fluoride (HF), and possibly small amounts of $UO_3$ and $UF_4$, in addition to steam and hydrogen.

For each mole of uranium hexafluoride introduced into the first reactor 10, from about 2 to 8 moles of steam and from 1 to 8 moles of hydrogen, are used, with preferred proportions of from 2 to 5.0 moles of steam and from 2 to 6 moles of hydrogen. The steam and hydrogen are introduced at a temperature of approximately 550° C.

A small portion of the product having a particle size of about 40 microns and less, is carried out of the reactor with the off-gas through the conduit 48 to the secondary reactor 12. The elutriation technique limits the accumulation in the bed of these small particles, thereby minimizing channeling and agglomeration problems that may occur. Removal of this portion of the product from the off-gas is normally achieved by the porous metal filters 54 or alternately in a separate filter vessel (not shown). A steady stream of the solid reaction products settles out of the fluidized bed and leaves the primary reactor 10 through the conduit 38 as particles having a size ranging from about 10 to 1000 microns.

In the upper portion 14 of the primary reactor 10 a mixture of steam, hydrogen, and hydrogen fluoride (HF) together with some of the finer particles of reaction products are commingled and leave the reactor 10 through the conduit 48.

SECOND REACTOR

The solid reaction products, having a size ranging from about 10 to 1000 microns, upon leaving the primary reactor 10 through conduit 38 enter the secondary reactor 12 through the line 42. The products may be conveyed either pneumatically such as by the use of off-gas from the primary reactor, or by any other conveyance means such as mechanical conveyors. Essentially complete reaction of the $UF_6$ to solid products occurs in the primary reactor such that only about 0.01 w/o of the uranium is unreacted $UF_6$. However, conversion to $UO_2$ is incomplete at these conditions and further reaction and purification is required.

In the secondary reactor 12 the products are converted almost completely to the desired end product, namely, uranium dioxide ($UO_2$). For that purpose, for each mole uranium in $UO_2F_2$ and $U_3O_8$ about 4 to 10 moles of steam and 2 to 6 moles of hydrogen are introduced into the secondary reactor 12 via the conduit 36. Upon entering the reactor 12 the particles of $UO_2F_2$ and $U_3O_8$ form a bed 62 distributed throughout the lower portion 20 on a perforated support plate 64.

Better reaction conditions exist in the second reactor because the bulk of the fluoride has been removed in the first reactor. The $UO_2F_2$ and $U_3O_8$ react with the steam and hydrogen to form a high quality grade of uranium dioxide and hydrogen fluoride gas and water vapor. The uranium dioxide particles settle at the lower end of the secondary reactor 12, then enter the outlet conduit 40 and are collected in a suitable receptacle (not shown).

The hydrogen, hydrogen-fluoride gas, and steam exit from the secondary reactor 12 at the upper portion 16 through the filters 54 and the conduit 56, the filters being fine enough to remove essentially all particles of solid reactants floating in the gas in the upper reactor portion 16. It should be understood that cyclone separators, or even electrostatic precipitators, can also be used, separately or jointly with the filters 56 so long as the desired high collection efficiency is achieved. The product from the second reactor consists of a fine particle $UO_2$ product of high purity with a residual fluorine content of 0.03 w/o or less. An oxygen/uranium ratio of about 2.05 is obtained with solids residence times in the reactor of from 2 to 3 hours at temperatures ranging from about 550 to 650° C. The uranium throughout is about 0.45 pound mole per hour per square foot of fluidized bed.

The $UO_2$ product of this fluid-bed process consists of granules of up to 1000 microns in diameter having a bulk density of about 3 gm./cc. and a BET surface area of from about 1 to 2 m.$^2$/gm. for the particle fraction of −45 to 60 mesh. These granules yield, with a single-pass hammermilling, a ceramic-grade powder with bulk densities of about 1.25 gm./cc. BET surface areas of from about 2 to 3 s.q. m./gm., and particle sizes averaging about 0.9 micron as determined by Fisher subsieve sizer. High quality pellets are obtained with densities of up to about 97% of theoretical density by dry slugging, pressing at from 50,000 to 90,000 p.s.i. with 0.3 w/o lubricant (e.g., a stearate polyvinyl alcohol) and sintering the compacts for four hours at 1650° C. in hydrogen.

An alternate form of the assembly of the reactors 10 and 12 is shown in FIG. 2. The reactors 10 and 12 are interconnected by a conduit 66 which, like the conduit 48, extends from the upper end of the primary reactor 10. However, an intermediate portion of the conduit 66 is connected to and extends through the lower end of the conduit 38 from where it continues to the upper portion of the secondary reactor 12. In this manner the pressure of the off-gases from the upper end as well as the lower end of the reactor 10 combine to provide pneumatic means for conveying the reactant products to the secondary reactor.

The following example is illustrative of the present invention.

EXAMPLE

Pilot runs were made in reactors using the fluidized bed technique of this invention to produce ceramic-grade uranium dioxide powder. The operating conditions and product characteristic are shown in Table I.

TABLE I.—EFFECT OF OPERATING CONDITIONS IN PRIMARY REACTOR SINTERED DENSITY OF $UO_2$ PRODUCT

| Test No. | 14 | 15 | 17 | 18 | 19 | 20 | 21A | 22A |
|---|---|---|---|---|---|---|---|---|
| Operating conditions: | | | | | | | | |
| $UF_6$ rate, s.c.f.m | 0.138 | 0.11 | 0.138 | 0.11 | 0.138 | 0.138 | 0.11 | 0.11 |
| Steam rate, s.c.f.m | 0.275 | 0.275 | 0.275 | 0.55 | 0.55 | 0.55 | 0.275 | 0.55 |
| $H_2$ rate, s.c.f.m | 0.655 | 0.655 | 0.655 | 0.38 | 0.38 | 0.38 | 0.655 | 0.38 |
| Temperature, °C | 550 | 590 | 590 | 590 | 590 | 550 | 550 | 550 |
| Fabrication results: Sintered density, percent T.D. | 93.4 | 91.0 | 91.4 | 95.3 | 95.7 | 96.7 | 96.0 | 97.2 |

S.c.f.m.=standard cubic feet per minute.
T.D.=theoretical density

The initial conversion of uranium hexafluoride to solids including $UO_2$, uranyl fluoride ($UO_2F_2$), uranium tetrafluoride ($UF_4$), and $U_3O_8$ is carried out in the primary reactor at the operating conditions and temperature listed in Table I. The intermediate solid compounds, $UO_2F_2$, $UF_4$, and $U_3O_8$ were reacted to form $UO_2$ in the second reactor at about 590° C. with additional steam and hydrogen. The primary influence upon the sintered density and uniform quality of the end product, $UO_2$, aside from separating the reactions into two separate reaction environments at different temperature level ranges, is the effect of temperature and steam rate in the primary reactor as is shown in Tables II and III. The pellets prepared in Tables I, II, and III were prepared using pressing and sintering procedures reasonably available under practical conditions. The sintering parameters were held constant in all the tests.

TABLE II.—EFFECT OF PRIMARY REACTOR TEMPERATURE ON SINTERABILITY OF $UO_2$ PRODUCT

[Steam rate: 0.275 s.c.f.m.]

| Test No. | 7 | 21A |
|---|---|---|
| Temperature, °C | 635 | 550 |
| Sintered density, percent T.D. | 89.4 | 96.0 |

TABLE III.—EFFECT OF PRIMARY REACTOR STEAM RATE ON SINTERABILITY OF $UO_2$ PRODUCT

| Test No. | 14 | 20 | 17 | 19 |
|---|---|---|---|---|
| Temperature, °C | 550 | 550 | 590 | 590 |
| Steam rate, s.c.f.m. | 0.275 | 0.55 | 0.275 | 0.55 |
| Sintered density, percent T.D. | 93.4 | 96.7 | 91.4 | 95.7 |

It will be evident that when the temperature in the fluidized bed of the primary reactor is 550° C., a very high density of 95.3 for the sintered product is attained, while at a reaction temperature of 590° C. the density is 91.4 (acceptable), while the product produced by reacting at 635° C. has dropped to a density of 89.6 showing a trend to undesirable and unacceptable low densities. For commercial reactor use, a pellet density of 93% is specified with a tolerance of ±1½%, consequently the DC-7 product will not meet specifications. The densities of pellets 19, 20, and DC21A can be readily controlled by modification of the pelletizing procedures to bring them into 93±1½%.

The pressing of the $UO_2$ powder into compacts can be varied so as to enable the processor to control the fired pellet density within a range of 2 to 3%. It is therefore readily possible to control the compacting pressure to reduce the density of ceramically active $UO_2$ powder material so as to bring it into the desired specification density range. However, a $UO_2$ powder of low ceramic activity cannot be economically or practically processed into the sintered pellets having the desired 93±1½% density range.

Consequently, the data in these tables indicate the criticality of the upper temperature limit of 590° C. for the first fluidized bed reactor. It will be appreciated that all the nuclear reactor design calculations are keyed into the $UO_2$ pellet density in the core.

The pellet densities obtained from powders prepared at the conditions tested ranged from 89.4 to 97.2% of the theoretical density. The steam rate and temperature are significant but the rate of introduction of $UF_6$ is not a critical factor. Higher pellet densities are obtained with powders prepared at higher steam rates and at lower temperature as shown in Tables II and III. In Table II, the effect of temperature upon the sintered density of uranium dioxide powder is shown. In Table III, the effect of the steam rate, which may include the influence of the hydrogen rate or of steam/hydrogen ratio, is illustrated at the temperatures of 550° and 590° C.

The foregoing indicate that uranium dioxide powder of ceramic quality is readily produced in the fluidized bed process and that the powder quality as affects its ceramic properties is responsive to temperature and steam rate.

Accordingly, the process of the present invention embodies a pair of coupled fluidized bed reactors which function more controllably to produce a better grade of $UO_2$ powder of a better grade of high ceramic quality than is possible with a single fluidized bed reactor or by any previously known fluidized bed reactor.

The entire reaction is carried out on a continuous process basis to produce $UO_2$ of a consistently uniform high quality.

It is understood that the above specification and drawings are merely exemplary and not in limitation of the invention.

What is claimed is:
1. A process for converting uranium hexafluoride to high quality ceramic-grade uranium dioxide comprising the steps of
 (a) establishing and maintaining in contact with a first fluidized bed a mixture consisting essentially of uranium hexafluoride, steam, and hydrogen in the proportion of 1 mole: 2 to 8 moles: 1 to 8 moles, while
 (b) concurrently heating the bed to a temperature ranging from about 475° C. to about 600° C. to produce intermediate reaction products including $UO_2F_2$ and $U_3O_8$,
 (c) establishing and maintaining a second fluidized bed comprising a mixture of the intermediate reaction products and conveying thereto the output from the first fluidized bed in contact with additional steam and hydrogen, to provide up to a total of 10 moles of steam and 6 mols of hydrogen, and
  (d) concurrently heating the second fluidized bed to a temperature ranging from about 575° to about 650° C. to produce fine particles of ceramic-grade uranium dioxide capable of being readily formed into compacts and fired into pellets having a density of from 90 to 97% of theoretical density.

2. The process of claim 1, wherein the relative portions of steam and hydrogen per mole of uranium in $UO_2F_2$ and $U_3O_8$ in the second fluidized bed are from about 4 to 10 moles of steam and about 2 to 6 moles of hydrogen.

3. The process of claim 1 wherein the relative amounts of steam and hydrogen per mole of $UF_6$ in the first reactor are in proportions of about 2 to 5 and 2 to 6 moles, respectively.

4. The process of claim 1 wherein the first fluidized bed is operated at a temperature ranging from 525° to 590° C.

5. The process of claim 4 wherein the first fluidized bed is operated at a temperature of about 550° C.

6. The process of claim 1 wherein the second fluidized bed is operated at a temperature ranging from 575° to 625° C.

7. The process of claim 6 wherein the second fluidized bed is operated at a temperature of about 600° C.

8. The process of claim 1 wherein the first fluidized bed is operated at a temperature ranging from 525° to 590° C. and the second fluidized bed is operated at a temperature ranging from 575° to 625° C.

9. The process of claim 8 wherein the respective bed temperatures are about 550° C. and 600° C.

10. A process of converting uranium hexafluoride to high quality ceramic-grade uranium dioxide comprising the steps of (a) establishing and maintaining in contact with a first fluidized bed a gaseous mixture of $UF_6$, from about 2 to 8 cubic feet per minute of steam and of from about 1 to 8 cubic feet per minute of hydrogen for each cubic foot per minute of the $UF_6$,
  (b) concurrently heating the bed to a temperature ranging from about 475° C. to about 600° C. to produce intermediate reaction products including $UO_2F_2$ and $U_3O_8$,
  (c) establishing and maintaining a second fluidized bed comprising a mixture of the intermediate reaction products in contact with steam and hydrogen, there being introduced for each mole of uranium in the $UO_2F_2$ and $U_3O_8$ about 4 moles of steam and 2 moles of hydrogen and
  (d) concurrently heating the second fluidized bed to a temperature ranging from about 550° to about 650° C. to produce fine particles of ceramic-grade $UO_2$ capable of being readily formed into compacts and fired into pellets having a density of from 90 to 97% of theoretical density.

11. The process of claim 10 in which in step (a) the relative proportions of steam and hydrogen per cubic foot of $UF_6$ are 2 to 5 cubic feet of steam and 3 to 6 cubic feet of hydrogen.

References Cited
UNITED STATES PATENTS

| | | | |
|---|---|---|---|
| 3,235,327 | 2/1966 | Blundell et al. | 23—355 |
| 3,179,491 | 4/1965 | Rokuo Ukaji et al. | 23—355 |

LELAND A. SEBASTIAN, Primary Examiner

U.S. Cl. X.R.

23—354